United States Patent [19]
Wood

[11] 3,741,670

[45] June 26, 1973

[54] PORTABLE POWER UNIT SUPPORT

[76] Inventor: Edward G. Wood, 14318 9 Mile Road, Battle Creek, Mich. 49017

[22] Filed: July 22, 1971

[21] Appl. No.: 165,166

[52] U.S. Cl. .................................. 408/92, 408/100
[51] Int. Cl. ............................................ B23b 45/14
[58] Field of Search ...................... 408/92, 99, 100, 408/101, 102

[56] References Cited
UNITED STATES PATENTS

| 611,387 | 9/1898 | Mueller | 408/92 X |
| 2,973,673 | 3/1961 | Grau | 408/99 |

FOREIGN PATENTS OR APPLICATIONS

| 7,593 | 1895 | Great Britain | 408/92 |

Primary Examiner—Francis S. Husar
Attorney—Roy A. Plant and Samuel Kurlandsky

[57] ABSTRACT

A portable attachment is provided for use with power hand drills, comprising a frame, means for clamping the frame to a piece of work, a carriage mounted to travel longitudinally along said frame, clamping means mounted on the carriage adapted to clamp a power hand drill to same, and mechanical means for forcing the carriage to travel along the frame. In operation, a power hand drill is clamped to the carriage, the frame clamped to a workpiece, power applied to the motor, and the mechanical feed means operated to cause the power hand drill to drill holes into or otherwise operate upon the workpiece.

6 Claims, 3 Drawing Figures

PATENTED JUN 26 1973

3,741,670

INVENTOR
EDWARD G. WOOD

BY Plant & Kurlandsky
ATTORNEYS

PORTABLE POWER UNIT SUPPORT

BACKGROUND OF THE INVENTION

Power hand drills have long been used for drilling, cutting, or otherwise operating upon a workpiece. It has been found by experience that operations performed by such a hand-held power tool are not extremely accurate. Moreover, when hand-held power tools are utilized to cut or drill into metal pipes or similar articles, the resulting vibration and inability to hold the power tools securely causes the drill bits or other tools to be quickly worn out or even broken. This is especially true when large bits are used to drill into steel pipes. Moreover, the use of a large hand-held power tool over extended periods of time is extremely fatiguing. Additionally, it is virtually impossible to apply a uniform feed force for the tool, with the result that the cutting or drilling operations are not precise, and there is danger of prematurely wearing out or breaking the tool.

SUMMARY OF THE INVENTION

Accordingly, it is an object of the present invention to provide a portable attachment for use with a portable power-driven hand drill and which may be used for performing operations on a workpiece with high precision.

It is an additional object to provide an apparatus of the type described having means for clamping to the workpiece operated upon, such clamping means being universally applicable to workpieces of varying sizes and shapes.

It is a further object to provide an apparatus of the type described which is light and easy to handle and which may be used with great accuracy.

It is an additional object to provide a device of the type described which may be simply manufactured from available parts and materials and which is relatively inexpensive.

An additional object is to provide a device of the type described for drilling holes or performing other operations such as chamfering or reaming, which has means for mechanically feeding the drill offering mechanical advantage while providing an easily controlled uniform force on the drill bit.

It is an additional object to provide a device which securely retains the portable drill during the drilling operation so that no lateral force is applied to the drill bit which might tend to cause it to become fractured or prematurely worn, and which permits the drilling operation to be carried out with precision.

It is a further object to provide an attachment of the type described wherein the entire weight of the drill is borne by the support device and workpiece, thereby enabling an operator to perform drilling and other operations with a minimum of fatigue.

A still additional object is to provide a device for support a portable power-driven drill which maintains the cutting tool in properly aligned position.

Still further objects and advantages of the invention will appear as the description proceeds.

To the accomplishment of the foregoing and related ends, the invention, then, consists of the useful apparatus for supporting and clamping a portable power drill to a workpiece herein fully described and particularly pointed out in the claims, the annexed drawing and the following description setting forth in certain detail an illustrative embodiment of the invention, such disclosed embodiment illustrating, however, but one of the various ways in which the principle of the invention may be used.

DESCRIPTION OF THE SPECIFIC EMBODIMENT

Figures 1, 2, 3:
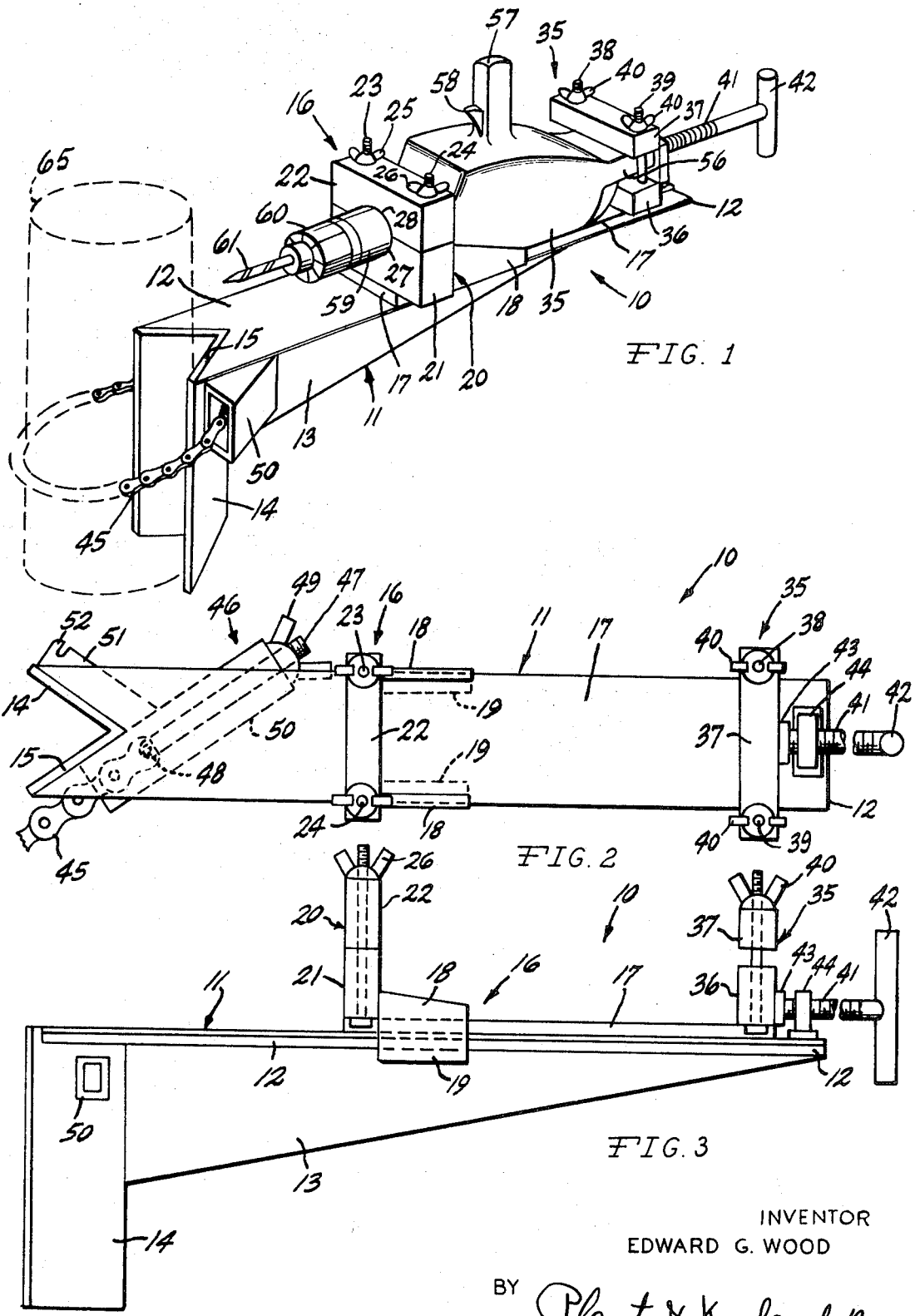
FIG. 1 is a perspective view of a preferred form of the apparatus according to the present invention.
FIG. 2 is a top view of the apparatus with the portable power drill omitted for clarity of illustration.
FIG. 3 is a side elevational view of the apparatus shown in FIG. 2.

Referring to FIG. 1, the portable power drill support 10 of the invention is shown mounted on a frame 11 comprised of a plate or bed 12 and lateral supports 13. A V-shaped clamp member 14 is affixed to a V-shaped notch 15 provided in the plate 12 as by welding, brazing, or forging.

A slide carriage 16 is slidably mounted on the plate 12 and comprises a slide plate 17, FIG. 3, lateral guide 18 affixed to the slide plate, and having engaging tabs or guides 19 at the lower edge thereof, inwardly directed, and engaging the plate 12 for retaining the slide plate 17 in position (FIG. 2). A forward drill clamp 20, FIG. 1, comprised of a lower clamp member 21 mounted on the slide plate 17 as by welding or by a bolt or studs, an upper clamp member 22, clamping bolts 23 and 24 extending through apertures provided in the lower and upper clamp members, and wing nuts 25 and 26. The clamping jaws of the clamp 20 are provided with arcuate recesses 27 and 28 for engaging the forward end of a portable drill body. A rear drill clamp 35 comprises a lower clamp member 36 affixed to the slide plate 17, an upper clamp member 37, clamping bolts 38 and 39, and wing nuts 40. Additionally, if desired, engaging tabs such as those designated 19 of the forward clamp 16 may be provided for the lower clamp member 36 of the rear clamp 35.

Travel for the slide carriage 16 is provided by a threaded rod or screw 41 having a handle 42 at one end and a disc 43, FIGS. 2 and 3, mounted on the end of the screw 41 and rotatable in respect thereto. The disc 43 engages the rear drill clamp 35 and may be affixed thereto as by the welding or brazing if desired. A retaining member 44 mounted on the plate 12 is provided with a threaded aperture engaging the threads of the screw 41.

Means for clamping the power drill support 10 to a workpiece preferably comprises the V-shaped clamp member 14 and a clamping chain 45. One end of the chain is adjustably retained by a chain tightening assembly 46. FIG. 2, comprising a threaded rod 47 having one end connected to the end of the chain by a pivot pin 48 and the other end threadedly engaged by a wind nut 49. The wing nut additionally abuts against one end of a tubular chain guide 50 affixed to one side of the V-shaped clamp member 14. A hook member 51 (FIG. 2) is affixed to the other side of the V-shaped clamp member 14 and is provided at its end with a chain link-engaging hook 52.

In operation, a portable power unit such as an electric hand drill is clamped into position on the slide carriage 16 as shown in FIG. 1, such a drill comprising a motor housing 55, a rear handle 56, a forward handle 57, and a trigger switch 58. Alternatively, the forward handle 57 may be absent and the trigger switch 58 associated with the rear handle 56. A reduced shaft support housing 59 supports a motor shaft (not shown) on which is mounted a chuck 60 and a drill bit 61. In mounting, the rear handle is clamped by the rear clamp 35 and the shaft supporting housing 59 is clamped by the forward clamp 16. The V-shaped clamp member 14 is placed in engagement with the workpiece and the chain 45 extended around the workpiece, as for example a pipe 65 (FIG. 1), and a chain link engaged by the hook 52. The wing nut 49 is then tightened, thereby tightening the chain about the workpiece until the drill press support 10 is rigidly clamped about the workpiece and supported. The power chord of the portable drill is then plugged into an electrical main and the trigger switch 58 actuated, causing the drill motor to operate. The drill bit 61 is brought into engagement with the workpiece by turning the handle 42, thereby causing the slide carriage 16 to travel forwardly. After engagement of the workpiece by the drill bit, continuing feed of the drill bit can be very precisely controlled by further turning of the screw 41 by the handle 42. Holes may thus be bored into workpieces, including pipes with great precision and control. It has been found that when portable drills are hand-held for drilling holes in workpieces such as pipes, the drill bit often wears out or breaks after only a few holes have been drilled. In contrast, when a portable drill is used in combination with the present apparatus in which the apparatus is firmly clamped to the workpiece, it has been found that the same drill bit may be utilized over long periods of operation for drilling many holes without undue wear or breakage.

Although the present invention has been illustrated and described in only a single embodiment, many variations may be made while still conforming to the spirit and scope of the invention. For example, power drills of various makes and different designs may be utilized. These power drills may have a looped rear handle, or alternatively a pistol grip type of handle. Although an electric drill has been shown, compressed air operated power drills may also be utilized. Additionally, variations may be made in the frame of the drill holding apparatus. For example, instead of having a flat bed for the frame, tubular frames may be used. Moreover, although the clamp member 14 has been shown as V-shaped, thereby well adapted for utilization for drilling pipes, other forms may be utilized, as for example flat or U-shaped where suitable for drilling workpieces of other shapes. Other forms of clamps may also be utilized other than chain clamps such as hooks or even cables.

While but one form of the invention has been shown and described, other forms will now be apparent to those skilled in the art. Therefore, the embodiment shown in the drawing is merely for illustrative purposes, and is not intended to limit the spirit and scope of the invention as above described and illustrated in the drawing.

Other modes of applying the principle of my invention may be employed instead of the one explained, change being made as regards the apparatus herein disclosed, provided that defined by any of the following disclosed, provided that defined by any of the following claims or its equivalent be employed.

I therefore particularly point out and distinctly claim as my invention;

1. A portable power unit support comprising:
    1. an elongated support frame,
    2. clamp means provided at one end of said frame for clamping said frame to a workpiece,
    3. carriage means slidably mounted on said frame having guide means slidably engaging said frame,
    4. clamp means mounted on said carriage adapted to clamp a portable power unit thereto; and
    5. feed means for causing said carriage means to travel comprising:
        a. a threaded rod,
        b. means mounted at the end thereof for manually rotating said rod; and
        c. a retainer affixed to said support frame having a threaded channel provided therethrough engaging said threaded rod, the forward end of said threaded rod being engageable with said carriage means for moving said carriage means when said threaded rod is rotated.

2. A portable power unit support according to claim 1, wherein said clamp means (2) comprises a clamp member affixed to the end of said frame and a chain member having one end engageable with respect to clamp member and the other end adjustably retained with respect to said clamp member.

3. A portable power unit support according to claim 2, wherein said means adjustably retaining said chain comprises a guide member having said chain movably disposed therein, a bolt having one end pivotally connected to said chain, and a threaded nut engaging the threaded end of said bolt and additionally engaging the end of said guide member, whereby tightening of said nut causes said chain to be pulled tight about said workpiece disposed between said chain and said clamp member.

4. A portable power unit support according to claim 3, wherein said clamp member is provided with means adapted to hook a link of said chain.

5. A portable power unit support according to claim 1, wherein said carriage means is provided with two clamps one adapted to engage the handle of said power unit and the other adapted to engage the forward reduced portion of said unit.

6. A portable power unit support according to claim 1, wherein said frame comprises an elongated plate, and said carriage means comprises a slide plate having guide means slidably engaging said plate.

* * * * *